No. 689,575. Patented Dec. 24, 1901.
M. CHURCH.
WIRE COILING DEVICE.
(Application filed Aug. 12, 1901.)
(No Model.)
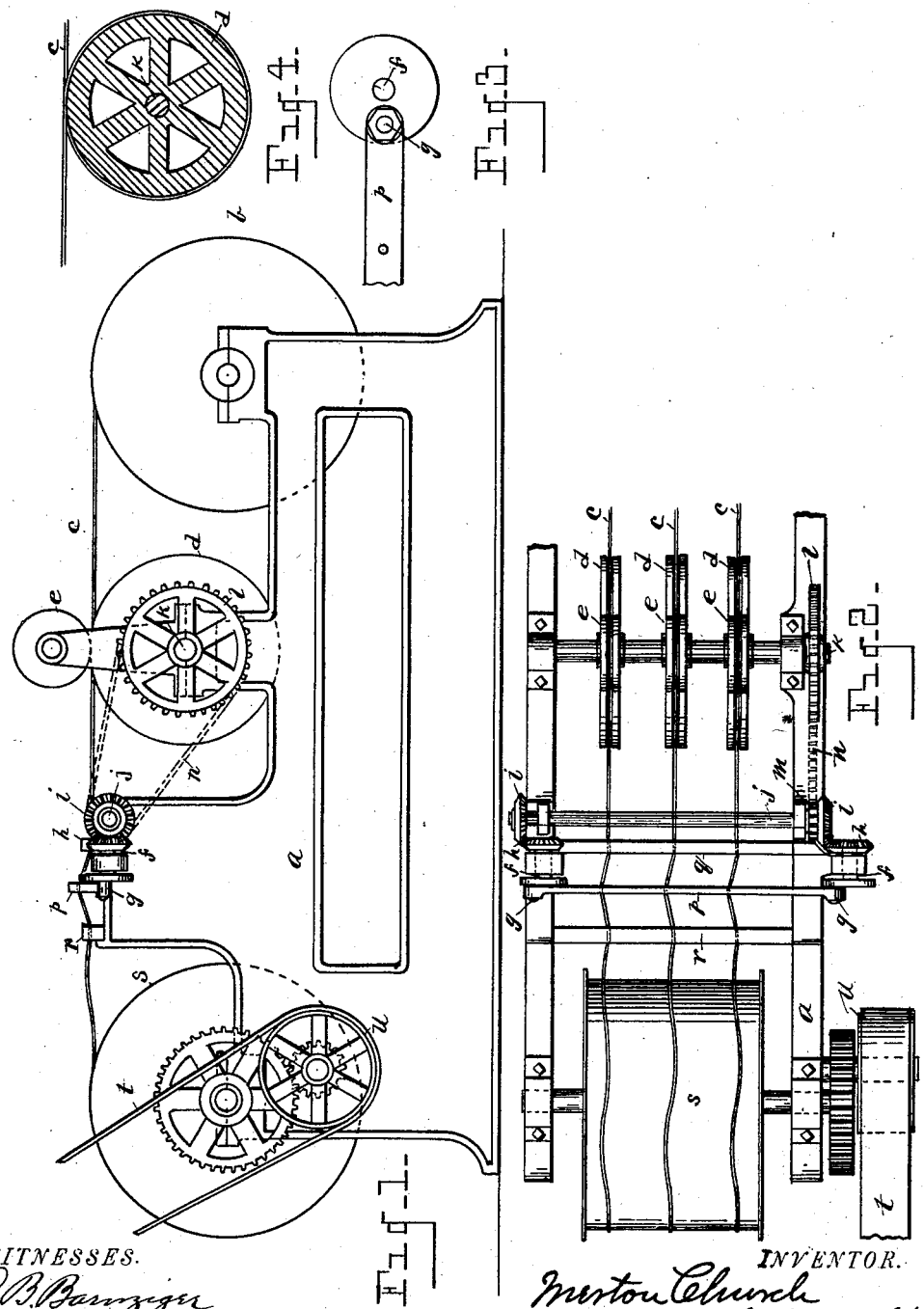
WITNESSES.
O. B. Barnziger
M. Hickey
INVENTOR.
Merton Church
By Newell S. Wright
His Attorney

United States Patent Office.

MERTON CHURCH, OF DETROIT, MICHIGAN, ASSIGNOR TO THE AMERICAN WIRE FENCE COMPANY, OF DETROIT, MICHIGAN, A CORPORATION OF MICHIGAN.

WIRE-COILING DEVICE.

SPECIFICATION forming part of Letters Patent No. 689,575, dated December 24, 1901.

Application filed August 12, 1901. Serial No. 71,716. (No model.)

*To all whom it may concern:*

Be it known that I, MERTON CHURCH, a citizen of the United States, residing at Detroit, county of Wayne, State of Michigan, have invented a certain new and useful Improvement in Wire-Coiling Devices; and I declare the following to be a full, clear, and exact description of the invention, such as will enable others skilled in the art to which it appertains to make and use the same, reference being had to the accompanying drawings, which form a part of this specification.

My invention has for its object a wire-coiling device embodied in the following specification and illustrated in the accompanying drawings, in which—

Figure 1 is a view in side elevation, illustrating my invention. Fig. 2 is a plan view. Fig. 3 is a detail view of the crank-shaft and bar actuated thereby. Fig. 4 is a view in vertical section through one of the tension-wheels, showing the wire passed thereabout.

The aim of my invention more particularly is to provide a wire-coiling device for coiling fence-wire to give to the fence-wire a desired degree of elasticity. I carry out my object as follows:

In the drawings any suitable supporting bed or frame is indicated at $a$, upon which is journaled a reel, (indicated at $b$,) upon which a supply of wire $c$ is wound. From the reel each wire passes over a tension-wheel $d$. It will be understood that there are to be as many of these tension-wheels as there are wires to be coiled. I have shown three of these tension-wheels in Fig. 2 of the drawings, but do not limit myself to any particular number. I prefer that the wire $c$ shall pass around the tension-wheel $d$, a smaller grooved guide-roller $e$ serving to hold the wire down upon the wheel $d$. The wheels $d$ and the guide-roller $e$ are designed more particularly to give a desired tension upon the wire.

The coiling device more particularly consists of a crank-shaft $f$, provided with a crank-arm $g$, journaled in any suitable manner upon the support $a$, the crank-shaft being driven also in any suitable manner. Thus, for example, the crank-shaft $f$ may be provided with a pinion $h$, meshing with the pinion $i$ upon a shaft $j$. The shaft $k$ of the wheels $d$ is shown provided with a sprocket-gear $l$, connected with a sprocket-wheel $m$ upon the shaft $j$ by a sprocket-chain $n$, so that the shafts $j$ $k$ would be synchronously driven. I prefer to duplicate the crank-shafts $f$ on each side of the machine with the crank-arm $g$ and the driving-pinions $h$ and $i$, the two crank-shafts $g$ $g$ being connected by a coiling-bar $p$, the wires $c$ passing through said bar $p$. On either side the movable bar $p$ are stationary bars $q$ $r$, through which the wires $c$ are also passed, the coiled wires passing from the bar $r$ either to a reel $s$, as shown in the drawings, or they might pass directly to a fence-weaving machine. (Not shown.) The reel $s$ may be driven in any suitable manner, as by a belt $t$ upon a pulley $u$, geared with the shaft of the reel $s$. The tension exerted upon the wire to coil it upon the reel $s$ or to carry the wire to the weaving-machine draws the wire through the coiling device.

It will be apparent that the bar $p$ has a movement corresponding to the movement of the crank-arm $g$, the bar thus having a reciprocatory and oscillatory movement to coil the wire. It will be obvious that the movement of the bar $p$ by the crank-arm constantly changes the point of deflection of the wire, carrying the wire not only forward and backward, but also giving to it at the same time an upward and a downward movement.

What I claim as my invention is—

1. In wire-coiling mechanism, the combination of a stationary device through which the wire is movable, and a bar having a longitudinally reciprocatory and oscillatory movement, to deflect the wire in a constantly-changing direction, whereby the wire is given a coiled or spiral appearance.

2. In wire-coiling mechanism, the combination with a stationary device through which the wire is movable, of a bar having a longitudinally-reciprocatory movement engaging the wire to deflect the wire in a constantly-changing direction, whereby the wire is given a coiled or spiral appearance, crank-arms engaged with opposite ends of the movable bar, and means to actuate the crank-arms.

3. In wire-coiling mechanism, the combination of a stationary device through which the wire is movable, of a movable bar to engage the wire, crank-arms engaged with both ends of the bar, a tension device, and means to synchronously actuate the tension device and the crank-arms.

4. In wire-coiling mechanism, the combination of two stationary devices through which the wire is movable, of a movable bar to engage the wire intermediate the stationary devices, crank-arms engaged with both ends of the movable bar, a tension device, and means to synchronously actuate the tension device and the crank-arm.

In testimony whereof I sign this specification in the presence of two witnesses.

MERTON CHURCH.

Witnesses:
N. S. WRIGHT,
M. HICKEY.